United States Patent [19]

Suzuki

[11] Patent Number: 4,734,719

[45] Date of Patent: Mar. 29, 1988

[54] CAPPING DEVICE AND LIQUID INJECTION RECORDING APPARATUS

[75] Inventor: Tetsuo Suzuki, Yokohama, Japan

[73] Assignee: Canon Kabushiki Kaisha, Tokyo, Japan

[21] Appl. No.: 16,527

[22] Filed: Feb. 17, 1987

Related U.S. Application Data

[63] Continuation of Ser. No. 690,942, Jan. 14, 1985, abandoned.

[30] Foreign Application Priority Data

Jan. 19, 1984 [JP] Japan .................................. 59-6368

[51] Int. Cl.[4] ......................... G01D 15/18; B65B 7/28; B67B 5/00

[52] U.S. Cl. .................................. 346/140 R; 346/75; 53/306; 53/310; 222/153

[58] Field of Search ........... 346/61, 75, 140 A, 140 R; 53/306, 310; 222/153

[56] References Cited

U.S. PATENT DOCUMENTS

| | | | |
|---|---|---|---|
| 3,786,964 | 1/1974 | Landen | 222/153 |
| 4,159,067 | 6/1979 | Akers | 222/153 |
| 4,371,881 | 2/1983 | Bork et al. | 346/140 R |
| 4,441,110 | 4/1984 | Hatakeyama et al. | 346/140 R |
| 4,551,735 | 11/1985 | Suzuki et al. | 346/140 R |
| 4,556,894 | 12/1985 | Terasawa | 346/140 R |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

This specification discloses a capping device having a cap for capping orifices for discharging liquid, and a moving structure for moving the cap, wherein a plurality of engaging members each have an engaging portion adapted to be engaged with a protrusion during the capping, and a releasing structure for moving at least one of the engaging members and releasing the capping. The specification also discloses a liquid injection recording apparatus provided with such capping device and a pump device for generating a pressure utilized to such the liquid from the orifices through the cap, a protrusion being provided in operative association with the movement of a member for effecting the pumping operation of the pump device.

16 Claims, 16 Drawing Figures

CAPPING DEVICE AND LIQUID INJECTION RECORDING APPARATUS

This application is a continuation of application Ser. No. 690,942 filed Jan. 14, 1985, now abandoned.

BACKGROUND OF THE INVENTION

1. Field of the Invention

This invention relates to a liquid injection recording apparatus and a capping device suitably used in the apparatus.

2. Description of the Prior Art

The liquid injection recording apparatus is called an ink jet printer and is an apparatus in which recording liquid (ink) is discharged from orifices communicating with a liquid flow path filled with the liquid to form flying liquid droplets and dot recording is effected on a recording medium by the liquid droplets.

In such a recording apparatus, there is generally provided a capping device for preventing drying of the ink in and near the orifice portion and for recovering the discharge function of the apparatus when it occurs that an ink-discharge operation of the apparatus can not be performed.

Such a capping device is usually provided at the home position of a carriage having a recording head mounted thereon and effects the capping operation including the operation for recovering the discharge function. It is known, during the non-discharge recovering operation, to reduce the pressure in a sub-tank provided on the recording head side by a negative pressure sucking operation through a cap, whereby the liquid is sucked from the orifices to recover the discharge function by which liquid droplets are discharged from the orifices.

However, if the cap is removed before the reduced pressure in the sub-tank recovers the normal pressure level, air may sometimes be sucked from the orifices.

As a result, there have occurred cases where the meniscus which is the fore end portion of the liquid in the nozzle retracts or bubbles are brought over into the liquid flow path, so that in spite of the operation for recovering the discharge function having been effected, the liquid still can not be discharged.

For this reason, it has been necessary to delay the cap release until the pressure in the sub-tank resumes its original level.

Thus, heretofore, a contrivance has been made such that the time until the pressure in the sub-tank regains its original level is electrically counted and the operator is informed of the time till the cap release by flicker of a lamp or the like, thereby letting the operator know the point of time at which the cap release can be effected.

However, even if such a structure is adopted, it has sometimes been the case that some users who do not understand the meaning of the flicker of the lamp or the like prematurely effect the cap release to cause the problem described above to occur.

Thus, a structure for locking the capping device until the pressure in the sub-tank regains its original level has been proposed.

A conventional device of such a structure is shown in FIGS. 1 to 4 of the accompanying drawings.

In FIG. 1, reference numerals 1 and 2 designate cartridges each having a bag member 3 containing liquid such as ink therein and removably mountable with respect to a recording apparatus.

In the following description, the bag members 3 for storing ink therein will be referred to as the main tanks.

A chamber partitioned from the main tank 3 is formed in the lower portion of the cartridge 1, and a waste liquid absorbing member 4 formed of sponge or the like is contained in this chamber so as to provide a waste liquid reservoir.

Reference numeral 5 designates a recording head for injecting liquid and effecting the recording. The recording head 5 is mounted on a carriage, not shown.

The rear half of the recording head provides a sub-tank 7 which is connected to the main tanks 3 by supply tubes 6 so that liquid 8 is supplied from the main tanks 3 into the sub-tank 7 through the supply tubes 6.

A supply pipe 9 is immersed in the liquid 8 within the sub-tank 7, and nozzles provided with orifices for discharging the liquid are connected to the supply pipe 9.

Although not shown, energy generating members such as electro-mechanical converting members comprising piezo elements or electro-thermal converting members such as heat-generating resistance members are provided near the fore ends of these nozzles, and by applying to these energy generating members an input signal conforming to a printing command, the energy for liquid droplet discharge is imparted to the liquid in the nozzles, whereby the liquid in the nozzles is discharged as liquid droplets from the unshown orifices of the recording head, and thus, dot printing is effected on a recording medium, not shown.

In FIG. 1, the device is shown in a state in which capping means has been operated.

Designated by 10 is a pump having a piston 11 therein. A push button 12 integral with the piston 11 extends upwardly through the upper end of the cylinder of the pump.

A cap 14 is connected to the pump 10 through nozzle tubes 13.

The cap 14 bears against the fore end portion of the recording head 5 and prevents clogging of the orifices, etc., resulting from the drying of the liquid in and near the orifice portions when not used and sucks the liquid from the orifices to thereby effect the recovering operation to ensure that the liquid droplets can be discharged.

One end of each suction tube 15 is connected to the pump 10 and the other end of each suction tube 15 is connected to the sub-tank 7, and the position at which the other end of each suction tube 15 is connected to the sub-tank 7 is higher than the position at which the supply tubes 6 are connected to the sub-tank 7.

One end of a waste liquid tube 16 is connected to the lower end of the pump 10 and the other end thereof is connected to the aforementioned waste liquid reservoir.

The piston 11 is normally biased upwardly by a spring, not shown.

A driving mechanism for the pump 10 is constructed as shown in FIG. 2.

That is, the pump 10 is fixed to a base 17 and the cap 14 is slidably fitted in a cap device 18.

One end of a lever 20 is pivotally supported on the base 17 through a support plate 19 and a projecting piece of flange 21 is provided on the fore end of this lever 20.

A guide slot **21*a* (shown as being of an inverted dog-legged shape) is formed in the projecting piece 21, and a pin 22 projecting from a cap holder 14*a* constituting the cap 14 as shown in FIG. 4 is slidably fitted in the guide slot 21*a***.

The pin 22 projects outwardly through a horizontal slot 18*b* formed in a side surface of the casing 18*a* of the cap device 18.

The cap holder 14*a* is provided with a rubber cap 14*b*, which is urged against the front face of the recording head.

The cap holder 14*a* is normally biased in a direction to jut out by a spring 23 as shown in FIG. 4.

A spring 24 is extended beyond a shaft 20*a* pivotally supporting the lever 20 and between the vicinity of the guide slot 21*a* and the fixed portion of the device, and biases the lever 20 clockwise as viewed in FIG. 3.

A projection 20*b* is provided on the underside of the lever 20, and is opposed to the push button 12 of the pump 10.

A projecting piece 20*c* is also provided on the underside of the lever 20 so as to be able to contact a switch SW1 fixed to the base 17.

On the other hand, as shown in FIG. 2, a solenoid 25 is fixed on the base 17 and the lower end of a lock lever 26 is pivotally connected to the fore end of the rod 25*a* of the solenoid 25.

The intermediate portion of the lock lever 26 is pivotally supported by a shaft 27, on which a torsion coil spring 28 is wound.

Accordingly, unless the solenoid 25 is electrically energized to attract the rod 25*a*, the lock lever 26 is at a position retracted from the free end of the lock lever 20, and one can freely operate the pump 10.

Under the above-described structure, the operations for capping and recovering the discharge function are effected in the following manner.

Where the liquid injection recording apparatus is not used for a long time, and during the transportation of the apparatus, the cap 14 bears against the recording head to prevent the liquid such as ink in the nozzle portion from drying or leaking.

At such time, the lever 20 is pivoted clockwise as viewed in FIG. 2 and the lock lever 26 assumes its upright position and locks the lever 20 as that the lever 20 cannot be raised.

Also, at this time, as shown in FIG. 3A, the lever 20 is pivoted clockwise by the force of the spring 24 and the pin 22 lies at the upper end of the guide slot 21*a*, and the cap 14 is retracted into the casing 18.

When, in this state, the free end of the lever 20 is pushed, the projection 20*b* of the lever 20 begins to depress the push button 12 of the pump 10 as shown in FIG. 3B.

At the same time, the pin 22 is guided to the intermediate portion of the guide slot 21*a* and advances into the slot 18*b*, and the cap 14 juts out, whereby the recording head is capped.

When the lever 20 is further depressed, the push button 12 of the pump 10 is further depressed and the piston 11 is lowered.

The piston 10 first closes its nozzle tube 13 side in the course of its lowering operation and air is sucked from the sub-tank 7 side through the suction tubes 15.

As a result, the pressure in the sub-tank 7 is reduced and the liquid is supplied from the main tanks 3 into the sub-tank 7 through the supply tubes 6.

When the liquid enters the sub-tank 7 and the suction tubes 15 by the pumping operation, the impedance on the suction tube 15 side becomes higher, and thereafter, the piston 11 no longer closes its nozzle tube 13 side and therefore, the liquid begins to be sucked from the nozzle side through the cap 14.

As a result, the bubbles or the like in the nozzles are removed and the recovery of liquid discharge function is effected.

Now, during this sucking operation, the switch SW1 is closed as shown in FIG. 3C.

On the other hand, when the operation for recovering the discharge function is being effected with the lever 20 pushed by the utilization of the lock lever 26, the hook 26*a* at the upper end of the lock lever 26 is brought into engagement with a projection 29 provided on the lever 20 to thereby keep the lever 20 in its depressed position, and after the pressure in the sub-tank has been restored to its original level, the solenoid 25 is operated to release the engagement.

That is, heretofore, the lever has been locked until the pressure in the sub-tank regains its original level, and after the pressure in the sub-tank has done so, the capping has been automatically released by the solenoid 25.

However, the locking by the lock lever 26 is of a simple structure provided by the engagement between the hook 26*a* and the projection 29, and this has sometimes given rise to the problem that when shocks or vibration is imparted to the hook 26*a*, the hook is simply disengaged from the projection 29 and the capping is released.

The occurrence of that problem in turn has sometimes led to the occurrence of another problem, that the function of preventing outflow of the liquid from the nozzles during transportation, which is another function of the capping device, and the function of preventing the clogging of the orifices of the nozzle due to the drying of the liquid therein when the apparatus is not used for a long time cannot be performed at all.

SUMMARY OF THE INVENTION

The present invention has been made in view of the above-noted problems peculiar to the prior art and an object thereof is to provide a capping device in which the capping state is not released even if shocks or vibration is imparted to the device.

It is also an object of the present invention to provide a capping device having a cap for capping orifices for discharging liquid, and moving means for moving said cap, said device further having a plurality of engaging members each having an engaging portion adapted to be engaged with a protrusion during the capping, and releasing means for moving said engaging members and releasing the capping.

It is a further object of the present invention to provide a liquid injection recording apparatus provided with a capping device having a cap for capping orifices for discharging liquid and moving means for moving said cap, and pump means for generating a pressure utilized to suck the liquid from the orifices through said cap, said apparatus further having a protrusion provided in operative association with the movement of a member for effecting the pumping operation of said pump means, a plurality of engaging members each having an engaging portion adapted to be engaged with said protrusion, and releasing means for moving said engaging members and releasing the capping.

DESCRIPTION OF THE PREFERRED EMBODIMENT

Figure 1:
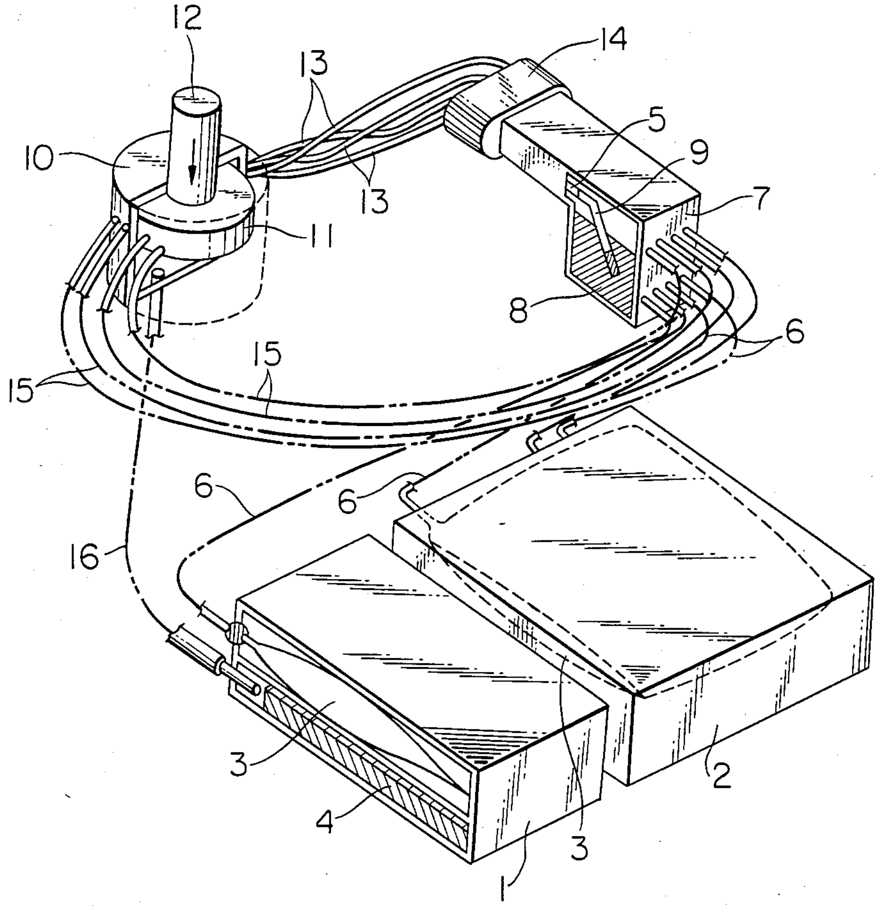
FIG. 1 PRIOR ART
FIGS. 1 to 4 schematically illustrate the structure according to the prior art, FIG. 1 being a perspective view illustrating a liquid supply system, FIG. 2 being a perspective view illustrating a capping mechanism, FIGS. 3A, 3B and 3C being illustrations of the capping operation, and FIG. 4 being a cross-sectional view of a cap device.
Figure 2:
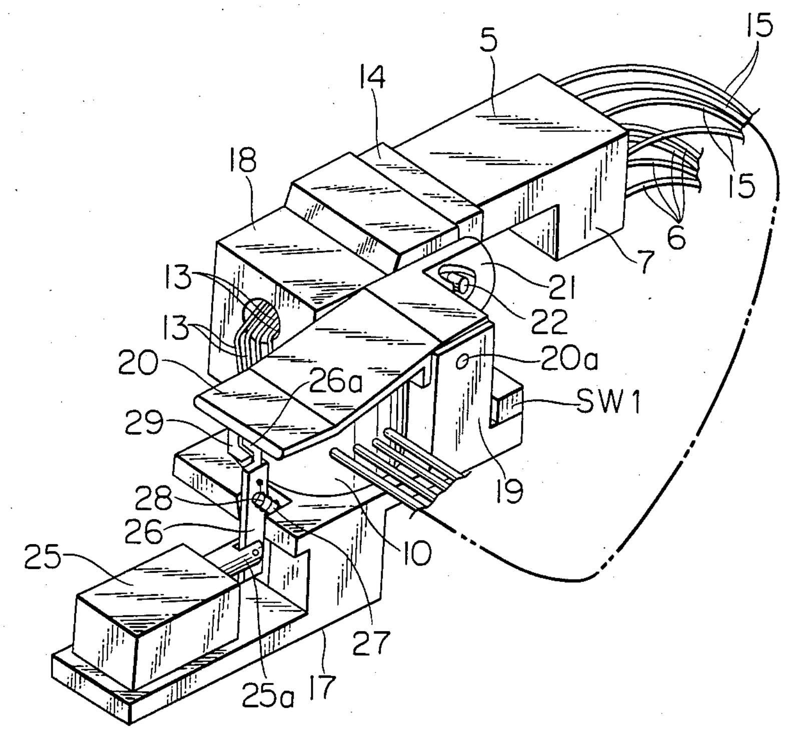
FIG. 2 PRIOR ART
Figure 3A:
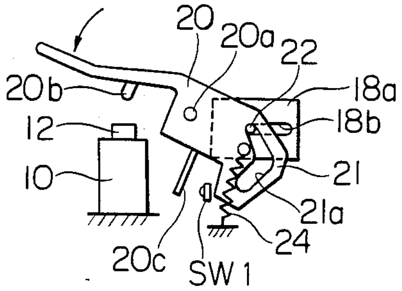
FIG. 3A PRIOR ART
Figure 3B:
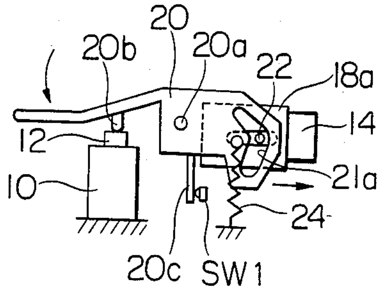
FIG. 3B PRIOR ART
Figure 3C:
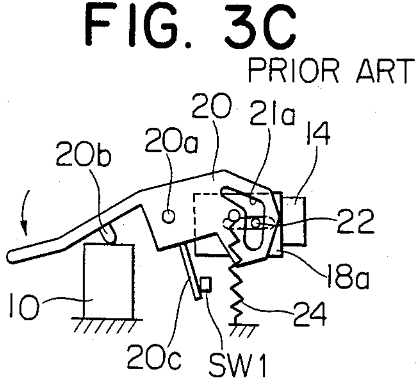
FIG. 3C PRIOR ART
Figure 4:
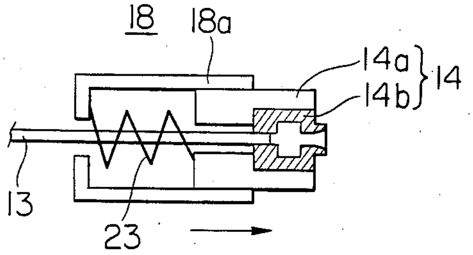
FIG. 4 PRIOR ART

The present invention will hereinafter be described in detail with respect to a preferred embodiment thereof shown in the drawings.

In FIGS. 5 to 8 which illustrate an embodiment of the present invention, portions similar or corresponding to the portions shown in FIG. 1 are given similar reference numerals and need not be described.

In the present embodiment, a projecting shaft 30 is provided on the underside of the free end portion of a lever 20 and left and right projecting pawls 31 and 32 are provided on the lower end of the shaft 30.

First and second lock levers 33 and 34 are provided for pivotal movement relative to a shaft 35 in that portion which corresponds to the shaft 30 on the base 17 side on which a pump is mounted.

The lock lever 33 has a bent portion 33*b* having an inclined surface 33*a* at the upper end thereof, and the lower end thereof is pivotally connected to the end of the rod 36*a* of a solenoid 36 through a shaft 37.

Figure 5A:
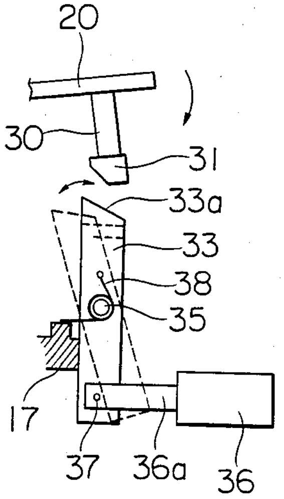
FIGS. 5 to 8 schematically illustrate an embodiment of the present invention, FIG. 5A being a side view of a lock mechanism, FIG. 5B being an exploded perspective view of the lock mechanism, FIGS. 6A–6C being side views illustrating the operation of the lock mechanism, FIGS. 7A–7D being front views illustrating the operation of the lock mechanism, and FIG. 8 being a block diagram of a control circuit.
Figure 5B:
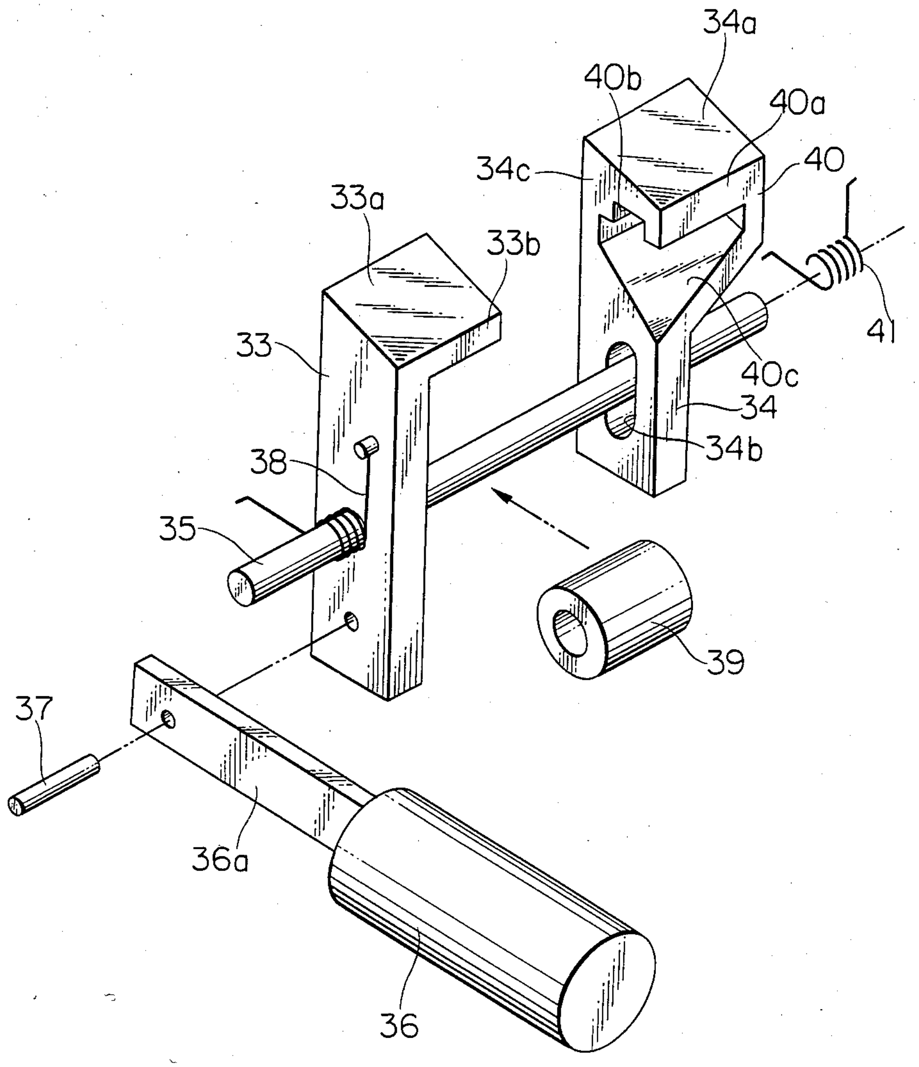
Figure 6A:
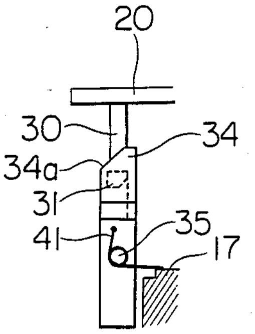
Figure 6B:
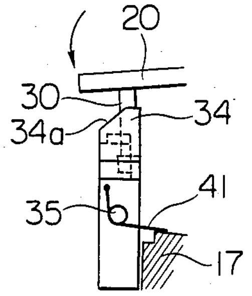
Figure 6C:
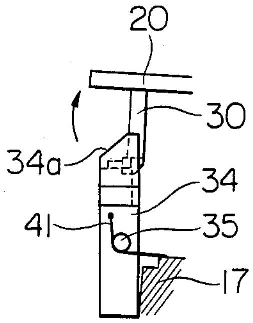

Laterally of the lock lever 33, a torsion coil spring 38 is wound on the shaft 35 and one end thereof is secured to the base 17 and the other end thereof is secured to the lock lever 33 and thus, the torsion coil spring 38 biases the lock lever 33 clockwise as viewed in FIGS. 5A and 5B.

A collar 39 which serves as a spacer is fitted on the shaft 35 between the lock levers 33 and 34, whereby the two lock levers are maintained spaced a predetermined distance apart.

The lock lever 34, as shown in FIGS. 5A and 5B, is formed with a bulged portion 40 having an inclined surface 34*a* at the upper end thereof, and a recess 40*b* is formed in the underside of a bent portion 40*a* on which the inclined surface 34*a* is formed.

The inner bottom part of the bulged portion 40 has an inclined surface 40*c*.

Laterally of the lock lever 34, a torsion coil spring 41 is wound on the shaft 35.

This torsion coil spring 41 biases the lock lever 34 clockwise as viewed in FIGS. 5A and 5B.

A slot 34*b* is formed in the lower portion of the lock lever 34, as shown in FIG. 5B, so that the lock lever 34 is pivotable about the shaft 35 and is also pivotable to the left and right along the shaft 35.

The operation of the present embodiment constructed as described above will now be described by reference to schematic views shown in FIGS. 6A to 7D.

During the capping operation, before the lever 20 is pushed, the first and second lock levers 33 and 34 are pivoted clockwise as viewed in FIGS. 5A and 5B by the torsion coil springs 38 and 41 and keep their upright position with the lower end portions thereof bearing against the end edge of the base 17 which serves as a so-called stopper.

Figure 7A:
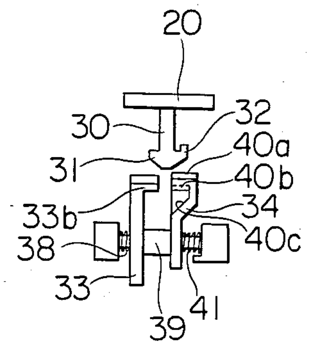

This state is shown in FIG. 7A.

When, in this state, the lever 20 is pushed, the pawls 31 and 32 descend and come into contact with the inclined surfaces 33*a* and 34*a* at the upper ends of the first and second lock levers 33 and 34, respectively, with the result that the two lock levers 33 and 34 are pivoted counter-clockwise as viewed in FIG. 5 and the pawls 31 and 32 are engaged with the undersides of the bent portions 33*a* and 40*a* at the upper ends of the two lock levers.

Simultaneously therewith, the two lock levers 33 and 34 are restored to their upright position.

Thus, the pawl 32 is fitted in and locked by the recess 40*b* formed in the underside of the bent portion 40*a* of the second lock lever 34.

In this state, the return force of the spring 24 is imparted to the lever 20 and therefore, the lever 20 tries to rise and the pawl 32 tries to keep its state in which it is fitted in the recess 40*b*, whereby the locked state is maintained.

Figure 7B:
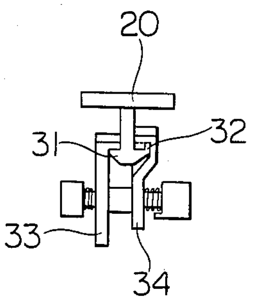

This state is shown in FIG. 7B.

This state is the capping position.

When the lever 20 is further depressed to effect pumping, the pawls 31 and 32 descend further.

At this time, the pawl 31 descends along the inner side surface of the first lock lever 33, while the other pawl 32 lowers along the inner inclined surface 40*c* of the bulged portion 40 of the second lock lever 34.

Figure 7C:
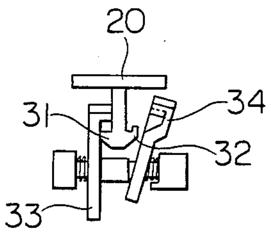
Figure 7D:
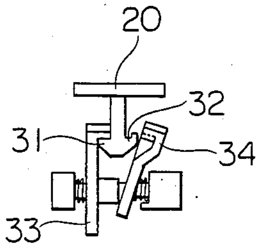

As a result, the second lock lever 34 pivots rightwardly as shown in FIG. 7C.

This state is the pumping position.

When the lever 20 is released after the pumping has been effected, the lever 20 is moved up due to the return force of the spring 24.

However, the pawl 31 is engaged with the bent portion 33*b* of the first lock lever 33 and cannot move upwardly from the capping position shown in FIG. 7B.

At this time, the other pawl 32 is in contact with the straight portion 34*c* of the second lock lever 34 and therefore is not fitted inside the bulged portion 40, and the second lock lever 34 is in its inclined position while flexing the coil spring 41.

This state is continued until the pressure in the subtank during the pumping 5 resumes its original level.

This predetermined time is counted from the state in which a switch SW1 has been closed by a projecting piece 20*c*.

When the timer counts out, the solenoid 36 (see FIG. 5B) is electrically energized, whereby the rod 36*a* is attracted.

Thereupon, the first lock lever 33 is pivoted counterclockwise as viewed in FIG. 5, and the pawl 31 and the bent portion 33*b* so far engaged with each other become disengaged from each other and the lever 20 is returned to its original position by the force of the spring 24 and thus, the capping is released.

Now, in the capping state, as previously described, the pawl 32 is fitted in the recess 40*b* of the second lock lever 34 and moreover, this state is maintained by the return force of the spring 24 and therefore, even if vibration or shocks are imparted, the pawl 32 will not be disengaged from the recess and the capping state can be maintained.

Figure 8:
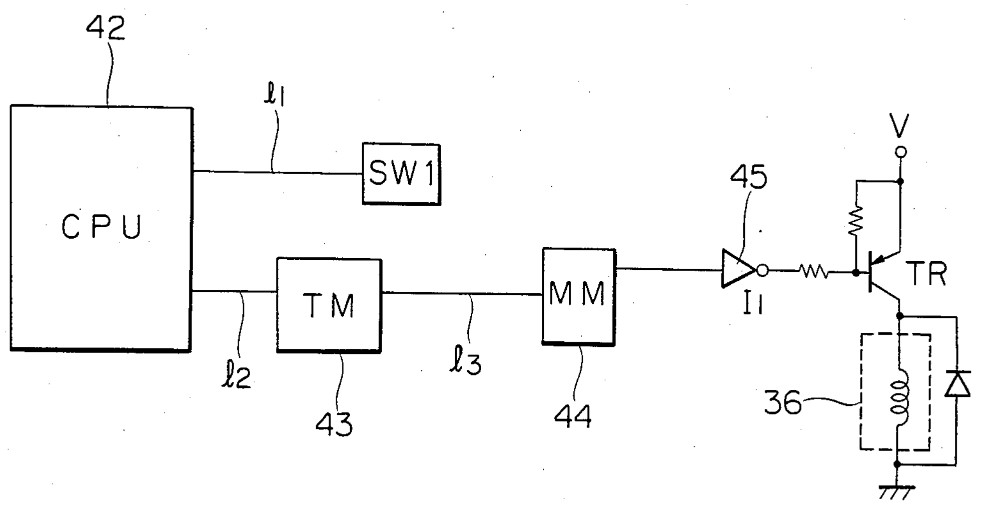

A control circuit for the above-described operation is shown in FIG. 8.

In FIG. 8, reference numeral 42 designates a CPU (central processing unit) connected to the switch SW1 through a signal line $l_1$.

A timer (TM) 43 is connected to the CPU 42 through a signal line $l_2$, and a monostable multivibrator (MM) 44 44 is connected to the timer 43 through a signal line $l_3$. A signal put out from the monostable multivibrator is inverted by an inverter (I1) 45 and renders a transistor TR conductive for a predetermined time, whereby a current flows to the solenoid 36, which thus releases the capping lock state.

Under such a circuit construction, the CPU 42 detects that the lever 20 has been operated and the switch SW1 has been closed, whereupon the timer 43 is started.

The set time by this timer 43 is a time empirically found for individual capping devices.

When the timer 43 counts out, the monostable multivibrator 44 is operated and the transistor TR is turned on through the inverter 45 and, as previously described, the solenoid 36 is energized, whereby the capping lock is released.

While an example using a solenoid has been shown as the means for releasing the capping lock, use may be made of an electro-mechanical converting member such as a motor, or many other means.

Also, in the above-described embodiment, the lever 20 has been shown as the means for effecting the pumping operation, whereas the member for effecting the pumping operation is not limited to such a lever, but other members such as a cam and the like may also be used, and in such case, a structure may be adopted in which a protrusion such as a pawl and an engaging portion adapted to be engaged therewith are provided between these members and the lock levers.

Also, in the above-described embodiment, the locking mechanism has been described with respect to an example using levers, whereas the levers need not always be used, but a modification provided by a member having another shape would also come to mind. Of course, as regards the shapes of the other mechanisms and members, other various modifications than those described in the above-described embodiment would come to mind.

As is apparent from the foregoing description, according to the present invention, the lever for effecting the capping and pumping operations can be locked in its capping state by the first and second lock levers for a predetermined time, i.e., until the pressure in the sub-tank regains its original state, and therefore, there does not occur the inconvenience of the capping being released before the pressure in the sub-tank regains its original state, as has heretofore been experienced.

Also, during transportation or where the apparatus is not used for a long time, the second lock lever and the lever for effecting the capping operation or the pumping operation are reliably maintained in their locked state through the pawls on the lever side, and therefore, even if vibration or shocks are imparted, they will not be disengaged from each other and drying or leakage of liquid such as ink will not occur.

What is claimed is:

1. A capping device comprising:

a cap movable between an open position spaced from a head of a liquid injection recording apparatus and a capping position in which said cap is moved toward the head for capping orifices in the head for discharging liquid, moving means for cooperating with said cap and with pump means for discharging liquid through the orifices, said moving means being movable between a plurality of positions to move said cap between the open and capping positions thereof and to operate the pump means first and second engaging members, each having an engaging portion adapted to be engaged with said moving means to restrict movement thereof, wherein moving said moving means to one of the positions thereof disengages said moving means and said second engaging member and releasing means for moving at least said first engaging member to disengage said moving means and said first engaging member.

2. A capping device according to claim 1, wherein said moving means includes a protrusion for cooperating with the pump means.

3. A capping device according to claim 1, wherein said engaging members move in response to said moving means.

4. A capping device according to claim 1, wherein said releasing means has an electro-mechanical converting member.

5. A capping device according to claim 4, wherein said electro-mechanical converting member is a solenoid.

6. A capping device according to claim 1, wherein said cap has a cap holder and a rubber cap provided in said cap holder.

7. A capping device according to claim 1, further comprising a spring member, and wherein said engaging members bear against a stopper with the aid of said spring member.

8. A liquid injection recording apparatus comprising:

head means defining orifices for discharging liquid, a capping device having a cap movable between an open position spaced from said head means and a capping position in which said cap is moved toward said head means for capping said orifices for discharging liquid, moving means movable between a plurality of positions to move said cap between the open and capping positions thereof, pump means for generating a pressure for sucking the liquid from said orifices through said cap, said pump means having an operating member for effecting the pumping operation of said pump means, a protrusion on said moving means for cooperating with said operating member when said moving means is in one of the positions thereof, first and second engaging members, each having an engaging portion adapted to be engaged with said moving means to restrict movement thereof, wherein moving said moving means to one of the positions thereof disengages said moving means and said second engaging member, and releasing means for moving at least said first engaging member to disengage said moving means and said first engaging member.

9. A liquid injection recording apparatus according to claim 8, wherein said releasing means has an electro-mechanical converting member.

10. A liquid injection recording apparatus according to claim 9, wherein said electro-mechanical converting member is a solenoid.

11. A liquid injection recording apparatus according to claim 8, wherein said moving means includes a lever for cooperating with said operating member.

12. A liquid injection recording apparatus according to claim 8, wherein said moving means includes a cam for cooperating with said operating member.

13. A liquid injection recording apparatus according to claim 8, wherein said releasing means is rendered inoperative for a predetermined time after the operation of said pump means.

14. A liquid injection recording apparatus according to claim 13, wherein the start of said time is effected in conjunction with the movement of said member for effecting the pumping operation.

15. A liquid injection recording apparatus according to claim 8, wherein said cap has a cap holder and a rubber cap provided in said cap holder.

16. A liquid injection recording apparatus according to claim 8, further comprising a spring member, and wherein said engaging members bear against a stopper with the aid of said spring member.

* * * * *

UNITED STATES PATENT AND TRADEMARK OFFICE

CERTIFICATE OF CORRECTION

PATENT NO. : 4,734,719

DATED : March 29, 1988

INVENTOR(S) : TETSUO SUZUKI

It is certified that error appears in the above-identified patent and that said Letters Patent is hereby corrected as shown below:

AT [57] IN THE ABSTRACT

Line 11, "such" should read --suck--.

COLUMN 1

Line 28, "operation" should read --operation,--.

COLUMN 2

Line 62, "of" (first occurrence) should read --or--.

COLUMN 6

Line 26, "lowers" should read --descends--.
Line 43, "pumping 5" should read --pumping--.

COLUMN 7

Line 3, "44" should be deleted.
Line 4, "monostable multivibrator" should read --monostable multivibrator 44--.

UNITED STATES PATENT AND TRADEMARK OFFICE
CERTIFICATE OF CORRECTION

PATENT NO. : 4,734,719

DATED : March 29, 1988

INVENTOR(S) : TETSUO SUZUKI

It is certified that error appears in the above-identified patent and that said Letters Patent is hereby corrected as shown below:

COLUMN 8

Line 2, "means" should read --means,--.
Line 8, "member and" should read --member, and--.

Signed and Sealed this

Twenty-eighth Day of March, 1989

*Attest:*

DONALD J. QUIGG

*Attesting Officer*

*Commissioner of Patents and Trademarks*